United States Patent [19]

Hashimoto

[11] Patent Number: 5,173,647
[45] Date of Patent: Dec. 22, 1992

[54] SERVO POSITIONING CIRCUIT

[75] Inventor: Shuichi Hashimoto, Tokyo, Japan

[73] Assignee: Fujitsu Limited, Kawasaki, Japan

[21] Appl. No.: 460,519

[22] Filed: Jan. 3, 1990

[30] Foreign Application Priority Data

Jan. 10, 1989 [JP] Japan ................ 1-003187

[51] Int. Cl.⁵ .......................................... G05B 13/00
[52] U.S. Cl. ................... 318/561; 318/594;
318/601; 318/685; 360/78.06
[58] Field of Search ............ 360/70, 75, 77.01, 77.02,
360/77.05, 78.01, 78.06; 318/560, 561, 590, 591,
592, 594, 595, 600, 601, 611, 615, 619, 685, 696

[56] References Cited

U.S. PATENT DOCUMENTS

| 3,883,894 | 5/1975 | Johnson | 324/177 |
|---|---|---|---|
| 4,096,425 | 6/1978 | Brown et al. | 318/561 |
| 4,184,108 | 1/1980 | Sordello et al. | 318/618 |
| 4,237,502 | 12/1980 | Erickson Jr. et al. | 318/561 X |
| 4,288,731 | 9/1981 | Lee | 318/561 X |
| 4,578,723 | 3/1986 | Betts et al. | 360/77 |
| 4,609,855 | 8/1986 | Andrews | 318/561 |
| 4,697,127 | 9/1987 | Stich et al. | 318/561 |
| 4,710,865 | 12/1987 | Higomura | 318/594 X |
| 4,724,369 | 2/1988 | Hashimoto | 318/561 |
| 4,988,933 | 7/1991 | Ogawa | 318/561 |

FOREIGN PATENT DOCUMENTS 0272076 6/1988 European Pat. Off. .

OTHER PUBLICATIONS

Patent Abstracts of Japan, vol. 7, No. 270 (P-240) (1415), 2 Dec. 1983 & JP-A-58 150171, 6 Sep. 1983.
Fraser, "Disk Accessing System", IBM Technical Disclosure Bulletin, vol. 19, No. 3, Aug. 1976, New York U.S., pp. 1103-1104.

Primary Examiner—William M. Shoop, Jr.
Assistant Examiner—David Martin
Attorney, Agent, or Firm—Staas & Halsey

[57] ABSTRACT

A servo positioning circuit having a speed detection circuit for detecting a real speed from a position signal from a servo object; a speed error detection circuit for generating an error between a target speed and the real speed; a position error detection circuit for generating a position error signal from the position signal; a switching unit for switching connection of the servo object to the speed error detection circuit or the position error detection circuit; and a main processing unit for generating a target speed in accordance with the position signal and controlling the switching of the switching unit. When the servo object nears a target position, speed control by the speed error detection circuit switches to position control by the position error detection circuit. Further, a speed detection gain adjustment unit is included in the speed detection circuit, and the main processing unit changes the speed detection gain of an speed detection gain adjustment unit in accordance with the amount of difference.

20 Claims, 9 Drawing Sheets

SERVO POSITIONING CIRCUIT

BACKGROUND OF THE INVENTION (1) Field of The Invention

The present invention relates to a servo positioning circuit for controlling the positioning of an object under servo control (hereinafter referred to as a "servo object") to a target position by speed control and position control.

(2) Description of the Related Art

Wide use is being made of servo positioning circuits for the positioning of magnetic heads on tracks of magnetic disk devices. In such servo positioning circuits, there is a desire for reduction of the time for movement.

That is, when the number of tracks to move (amount of movement) is indicated, a main processing unit generates a target speed curve in accordance with the number of tracks to move, drives a voice coil motor by coarse (speed) control, and, when reaching near the target position, switches a switching unit to the position control side and performs fine (position) control on the voice coil motor for positioning at the desired track.

During deceleration, however, the real speed draws a path different from the target speed curve. The real speed increases until it reaches the target speed curve, and then decreases. When, however, the differences (amounts of movement) differ, there will be a difference in the gradient of the curve of acceleration at the time of reaching the target speed curve and the gradient of deceleration of the target speed curve at that time depending on the movement. Further, depending on the magnitude of the real speed at the time of reaching the target speed curve, the amount of overshoot will change according to the difference, resulting in a different path of deceleration of the real speed.

This path of deceleration is characterized by a larger error from the decelerating target speed curve the larger the difference. As a result, it takes a longer time for movement.

Further, the gradient of the curve of the real speed differs depending on the magnitude of the difference. This results in a difference of the angle of entry of the real speed upon switching between coarse/fine control. In the case of the real speed having a small gradient and a small difference, fine control is switched to before the real speed reaches zero, the overshoot becomes large, and the time required for positioning by the fine control becomes longer.

In this way, due to the difference in the path of the real speed caused by the magnitude of the difference, there was the problem that the overshoot was large during positioning and that the time required for positioning became longer. Further, there was the problem that the time required for movement of the same remaining movement increased and the problem that the smaller the difference, the more the time could not be shortened.

SUMMARY OF THE INVENTION

The present invention has as its object the shortening the time required for movement and positioning regardless of the amount of difference.

The present invention realizes this object by providing a servo positioning circuit having a speed detection circuit for detecting a real speed from a position signal from a servo object; a speed error detection circuit for generating an error between a target speed and the real speed; a position error detection circuit for generating a position error signal from the position signal; a switching unit for switching connection of the servo object to the speed error detection circuit or the position error detection circuit; and a main processing unit for generating a target speed in accordance with the position signal and controlling the switching of the switching unit. When the servo object nears a target position, speed control by the speed error detection circuit switches to position control by the position error detection circuit. Further, a speed detection gain adjustment unit is included in the speed detection circuit, and the main processing unit changes the speed detection gain of the speed detection gain adjustment unit in accordance with an amount of difference.

DESCRIPTION OF THE PREFERRED EMBODIMENTS

Before describing the preferred embodiments, a more detailed explanation will be given of the prior art.

Figure 1:
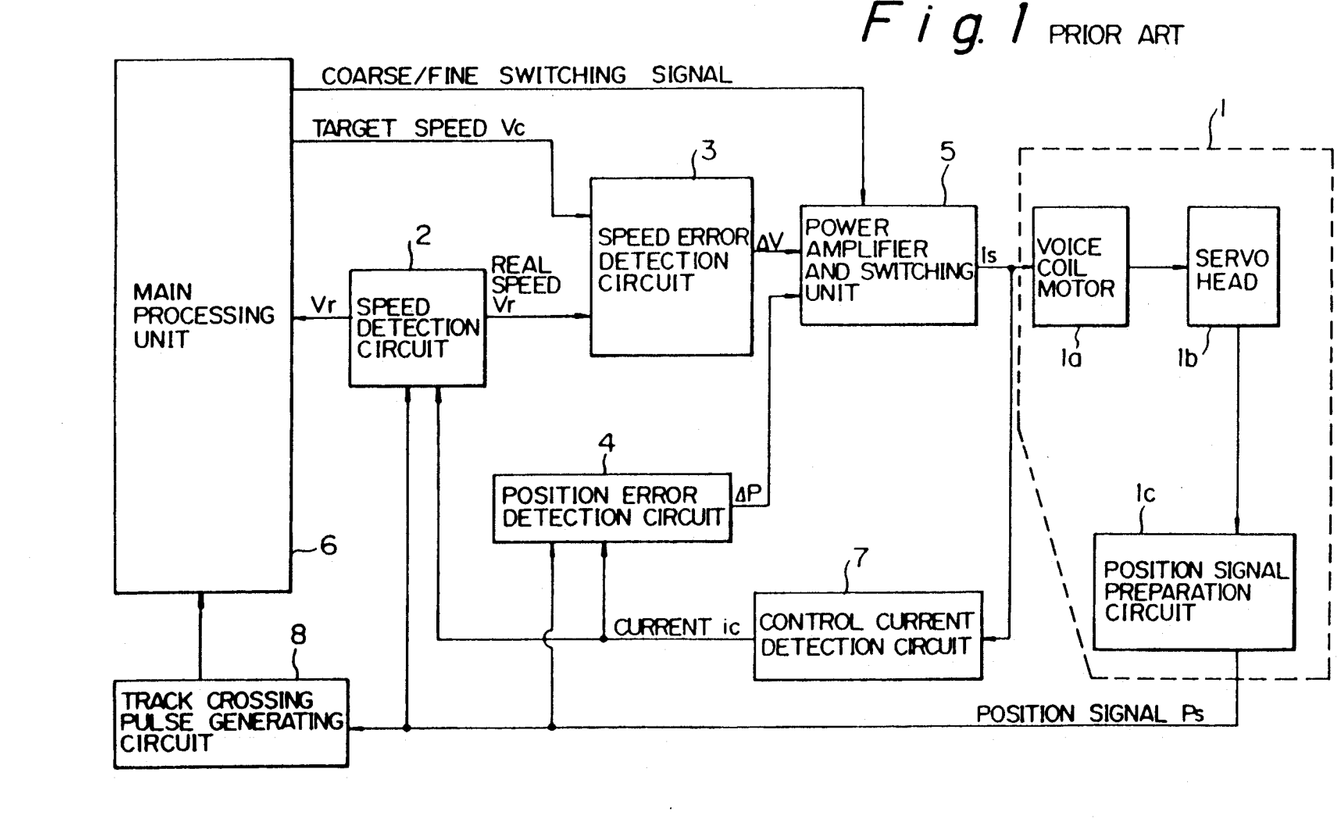
FIG. 1 and FIG. 2 are block diagrams of the prior art.
Figure 2:
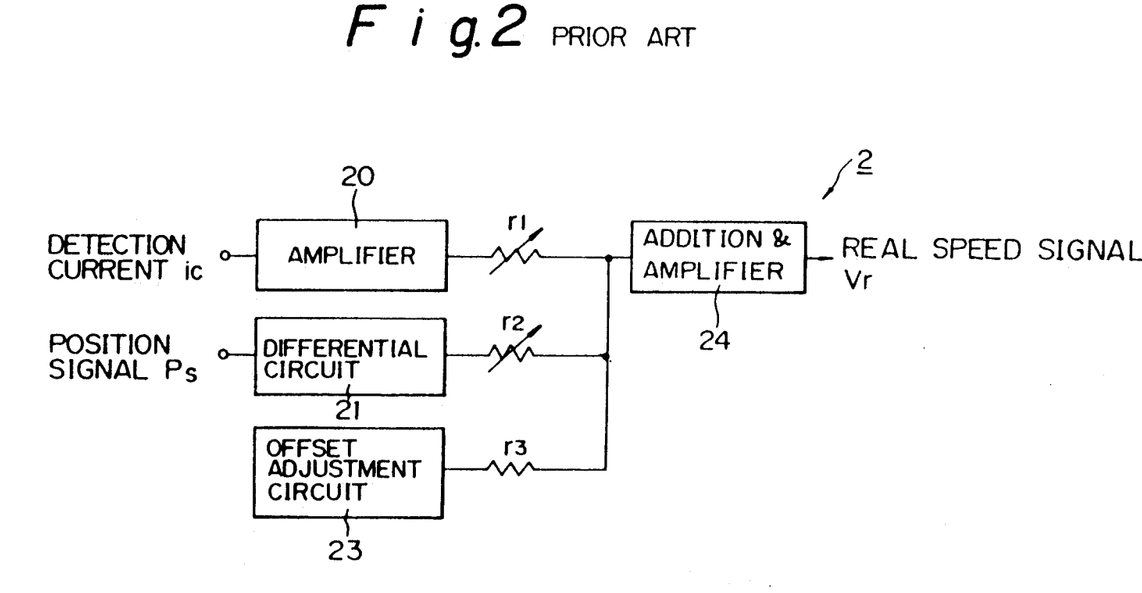

FIGS. 1 and 2 are explanatory views of the prior art.

In FIG. 1, reference numeral 1 is a servo object, which has a voice coil motor 1a, servo head 1b moved by the voice coil motor 1a, and a position signal preparing circuit for preparing the position signal Ps from the signal read by the servo head 1b.

Reference numeral 2 is a speed detection circuit, which detects a real speed Vr from the position signal Ps and the later mentioned detection current ic, and reference numeral 3 is a speed error detection circuit, which generates a speed difference ΔV between the later mentioned target speed Vc and the real speed Vr.

Reference numeral 4 is a position error detection circuit, which generates a position error signal ΔP from the position signal Ps and the detection current ic and performs position control. Reference numeral 5 is a power amplifier and switching unit, which has a changeover switch and power amplifier, for switching the connection of the speed error detection circuit 3 or position error detection circuit 4 to the servo object 1 by a coarse (speed control)/fine (position control) switching signal from the latter mentioned main processing unit.

Reference numeral 6 is a main processing unit, which is constituted by a microprocessor, for generating a target speed curve Vc in accordance with the amount of movement and also for monitoring the position of the servo object 1 by the later mentioned track crossing pulses to generate a signal for switching from coarse control (speed control) to fine control (position control) in the vicinity of the target position.

Reference numeral 7 is a control current detection circuit which detects the control current Is of the power amplifier 5 and generates a detection current signal ic. Reference numeral 8 is a track crossing pulse generating circuit which generates track crossing pulses from the position signal Ps and outputs them to the main processing unit 6.

When the number of tracks to move (amount of movement) is given, the main processing unit 6 generates a target speed curve Vc in accordance with the number of tracks to move, drives the voice coil motor 1a by speed control, and, when reaching near the target position, switches the switching unit 5 to the position control side and performs position control on the voice coil motor 1a for positioning at the desired track.

The speed detection circuit 2, as shown in FIG. 2, has an amplifier 20 for amplifying the detection current ic; a differential circuit 21 for differentiating the position signal Ps and generating a speed component; an offset adjustment circuit 23; and an amplifier 24 for adding these outputs and amplifying the same and can be initially adjusted in gain by operating adjustment resistors r1 and r2.

FIG. 3, FIGS. 4A, 4B, and 4C, and FIGS. 5A and 5B are explanatory views of the problems in the prior art.

Figure 3:
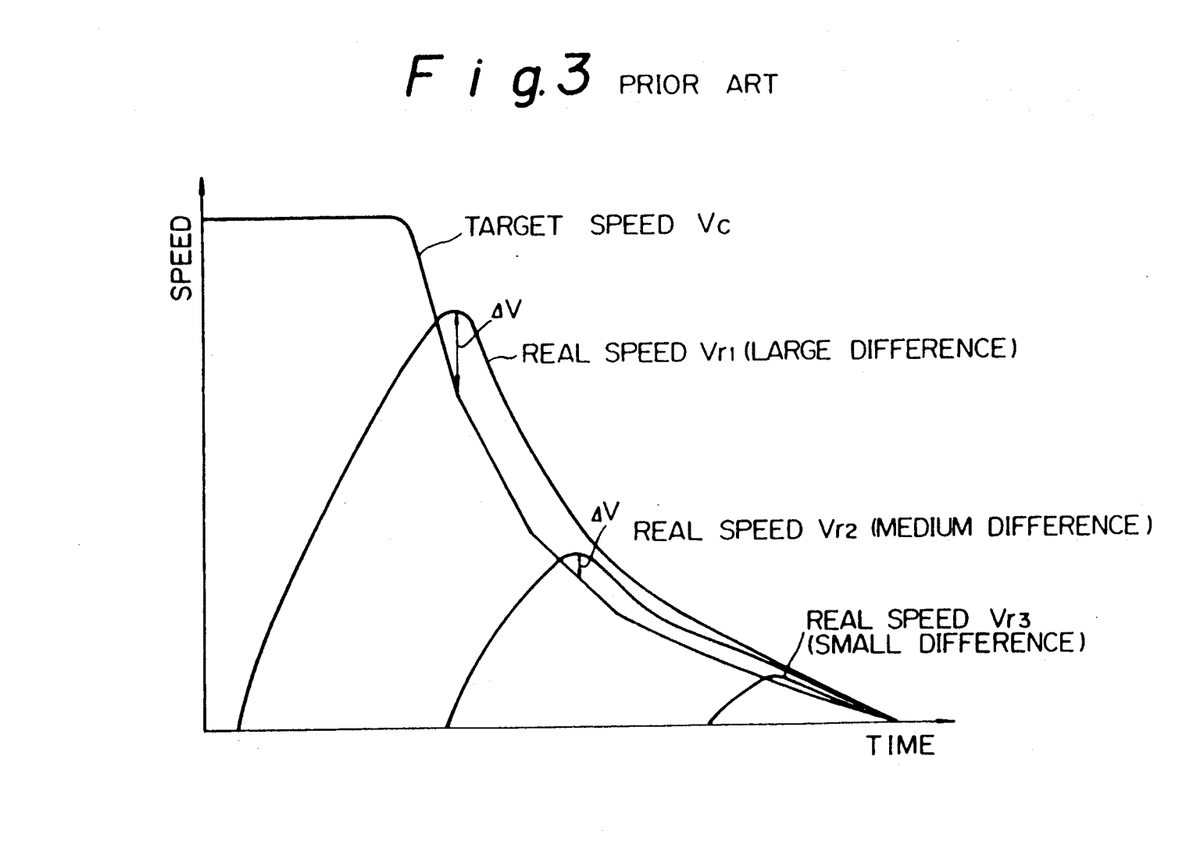
FIG. 3, FIGS. 4A, 4B, and 4C, and FIGS. 5A and 5B are graphs illustrating the problems in the prior art.

Deceleration results in the real speed Vr1 to Vr3 drawing a path, with respect to the target speed curve Vc shown in FIG. 3.

At this time, the real speed Vr1 to Vr3 increases until reaching the target speed curve Vc, then decreases. When the differences (amounts of movement) differ, however, the gradient of the curve of the deceleration of the target speed curve Vc differ according to the amount of difference. Further, depending on the magnitude of the real speed upon reaching the target speed curve Vc, as shown in FIG. 3, the overshoot ΔV differs according to the difference, and the path of deceleration of the real speed becomes unequal and varies as Vr1 to Vr3.

This path of deceleration, as shown in FIG. 3 and FIGS. 4A to 4C, is characterized by a larger error ΔV with respect to the decelerating target speed curve Vc the larger the difference. That is, even if the remaining movement is the same, the larger the difference, the faster the speed and the faster the amount of remaining movement rapidly decreases. The decelerating target speed curve Vc changes in accordance with the change in the remaining movement, so the smaller the difference, the flatter the deceleration target speed curve Vc with respect to time.

Figure 4A:
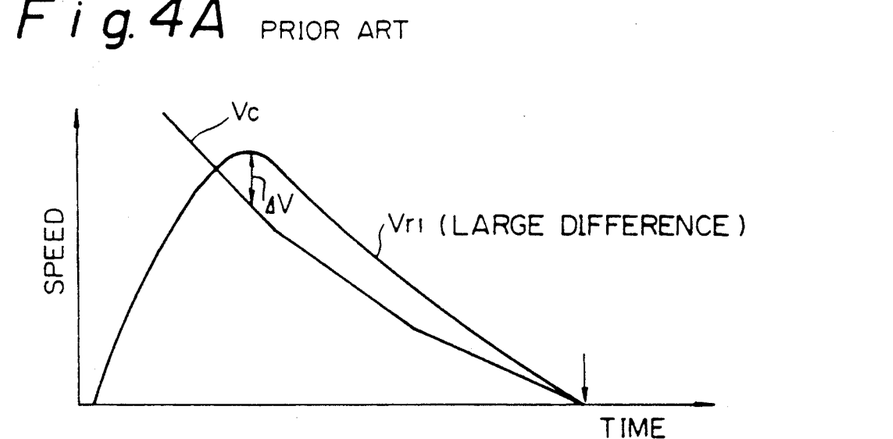
Figure 4B:
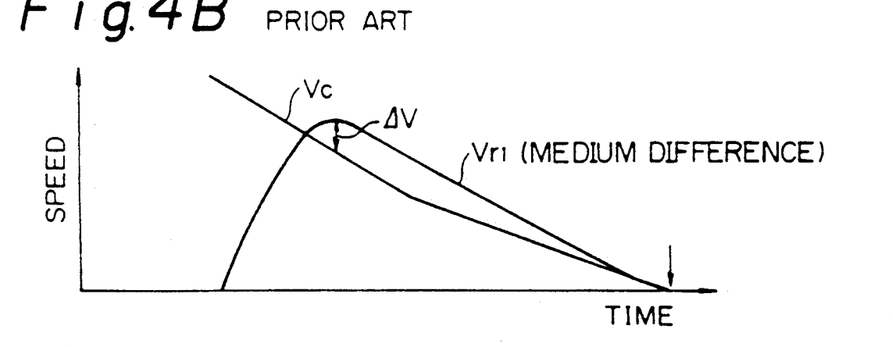
Figure 4C:
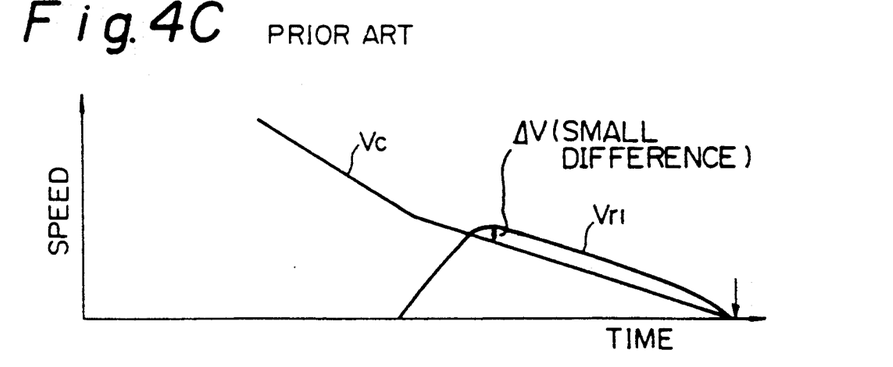

This causes the phenomenon that the smaller the difference, the flatter the real speed curve and, as shown in FIGS. 4A to 4C, the smaller the difference, the longer the time required for the same amount of movement as shown by the arrows.

Further, as mentioned earlier, the gradient of the curve of the real speed differs depending on the magnitude of the difference. This results in a difference of the entry angle of the real speed upon switching between coarse/fine control.

Figure 5A:
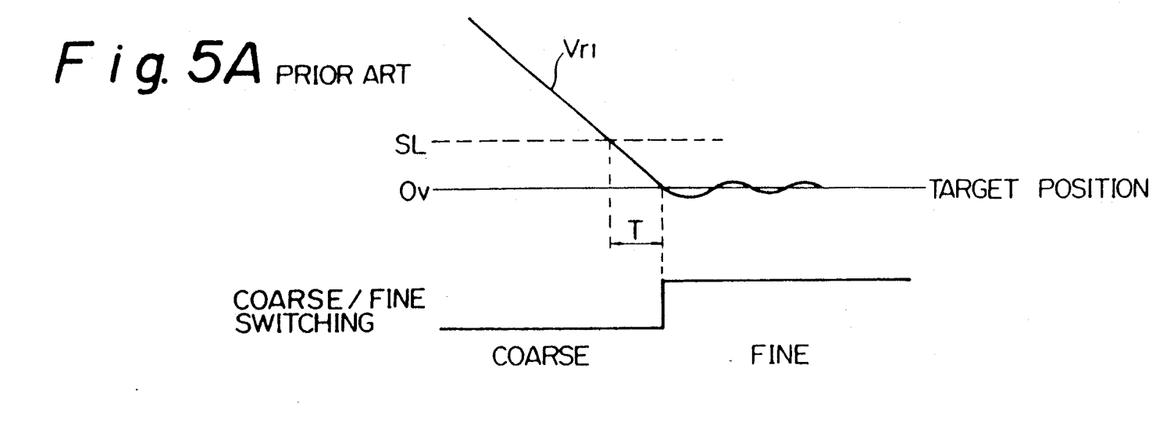
Figure 5B:
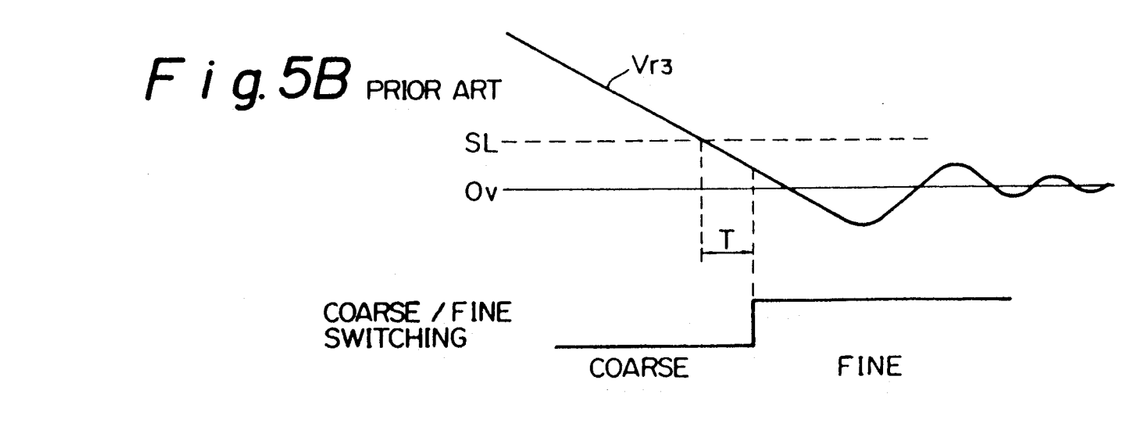

As shown in FIGS. 5A and 5B, after a predetermined time T elapses from when the real speed Vr1 and Vr3 reaches the slice level SL close to zero Ov, the coarse control is switched to fine control. Thus, as shown in FIG. 5B, in the case of small difference with a small gradient of the real speed, fine control is switched to before the real speed reaches zero Ov, the overshoot becomes large, and the time required for positioning by the fine control becomes longer.

In this way, as mentioned earlier, in the prior art, due to the difference in the paths of the real speed caused by the magnitude of the difference, there was the problem that the overshoot was large during positioning and that the time required for positioning became longer. Further, there was the problem that the time required for the same amount of remaining movement increased and the problem that the smaller the difference, the more the time, and the time for positioning could not be shortened.

Therefore, the present invention has as its object the provision of a servo positioning circuit which can shorten the time required for movement and positioning without regard to the amount of difference.

The servo positioning circuit according to the present invention will now be explained in detail.

Figure 6A:
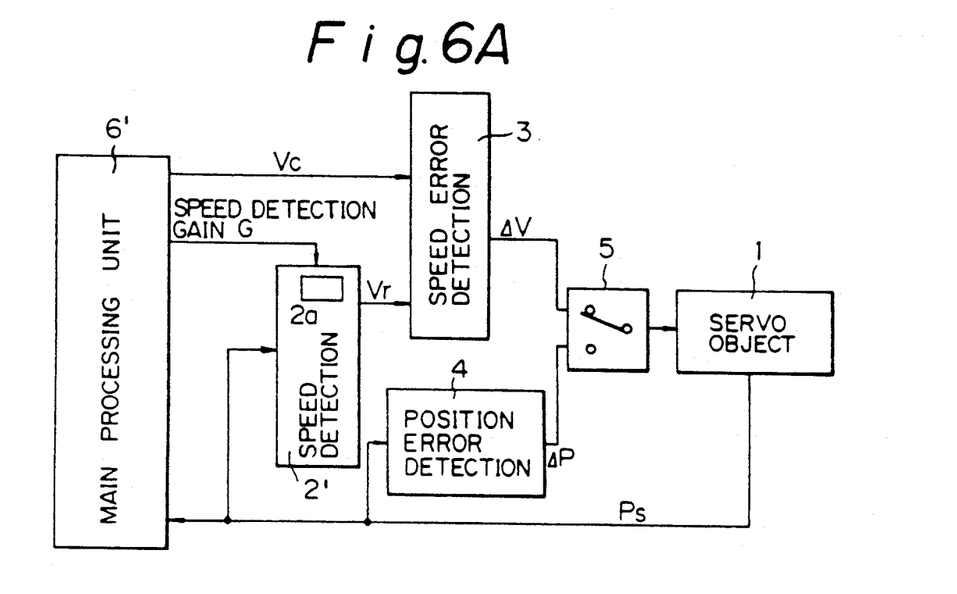
FIG. 6A is a block diagram of the present invention and FIG. 6B is a graph for explaining the principle of the present invention.
Figure 6B:
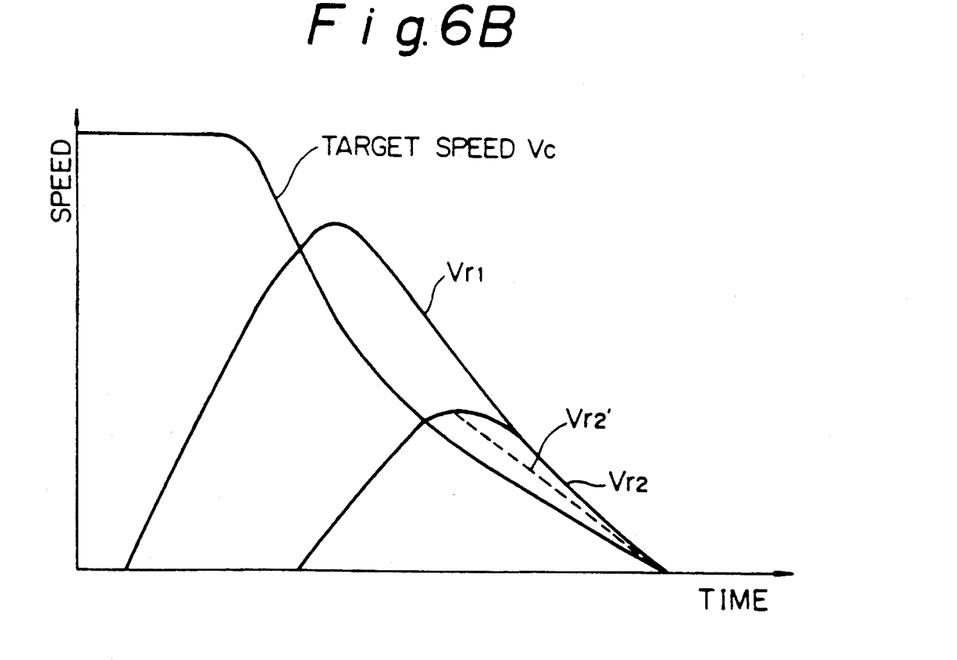

FIGS. 6A and 6B are views explaining the principle of the present invention.

The present invention, as shown in FIG. 6A, provides a servo positioning circuit having a speed detection circuit 2 for detecting a real speed Vr from a position signal Ps from an object 1 under servo control; a speed error detection circuit 3 for generating an error between a target speed Vc and the real speed Vr; a position error detection circuit 4 for generating a position error signal ΔP from the position signal Ps; a switching unit 5 for switching connection of the servo object 1 to the speed error detection circuit 3 or the position error detection circuit 4; and a main processing unit 6 for generating a target speed Vc in accordance with the position signal Ps and controlling the switching of the switching unit 5, in the vicinity of the target position, from speed control by the speed error detection circuit 3 to position control by the position error detection circuit 4, wherein provision is made of a speed detection gain adjustment unit 2a provided in the speed detection circuit 2 and where the main processing unit 6 changes the speed detection gain of the speed detection gain adjustment unit 2a in accordance with the difference d.

To resolve the problems in the case of a small difference, as shown in FIG. 6B, it is sufficient to bring the small difference real speed curve Vr2' close to the large difference real speed curve Vr1 such as with Vr2.

Therefore, in the present invention, the speed detection gain is changed in accordance with the difference.

If the speed detection gain G in the case of a small difference is made small, then the detected real speed on the circuit becomes smaller and the apparent speed error becomes small, so that the servo action becomes smoother. Therefore, the actual real speed becomes larger and the speed error of the real speed becomes large too, so the real speed curve approaches the large difference real speed curve Vr1 such as from Vr2' (dotted line) to Vr2. In this case, Vr2' corresponds to the curve Vr2 shown in FIG. 3.

By this, even with a small difference, the same real speed curve is drawn as with a large difference and it is possible to prevent the time for movement and positioning from becoming longer in the case of a small difference.

Figure 7:
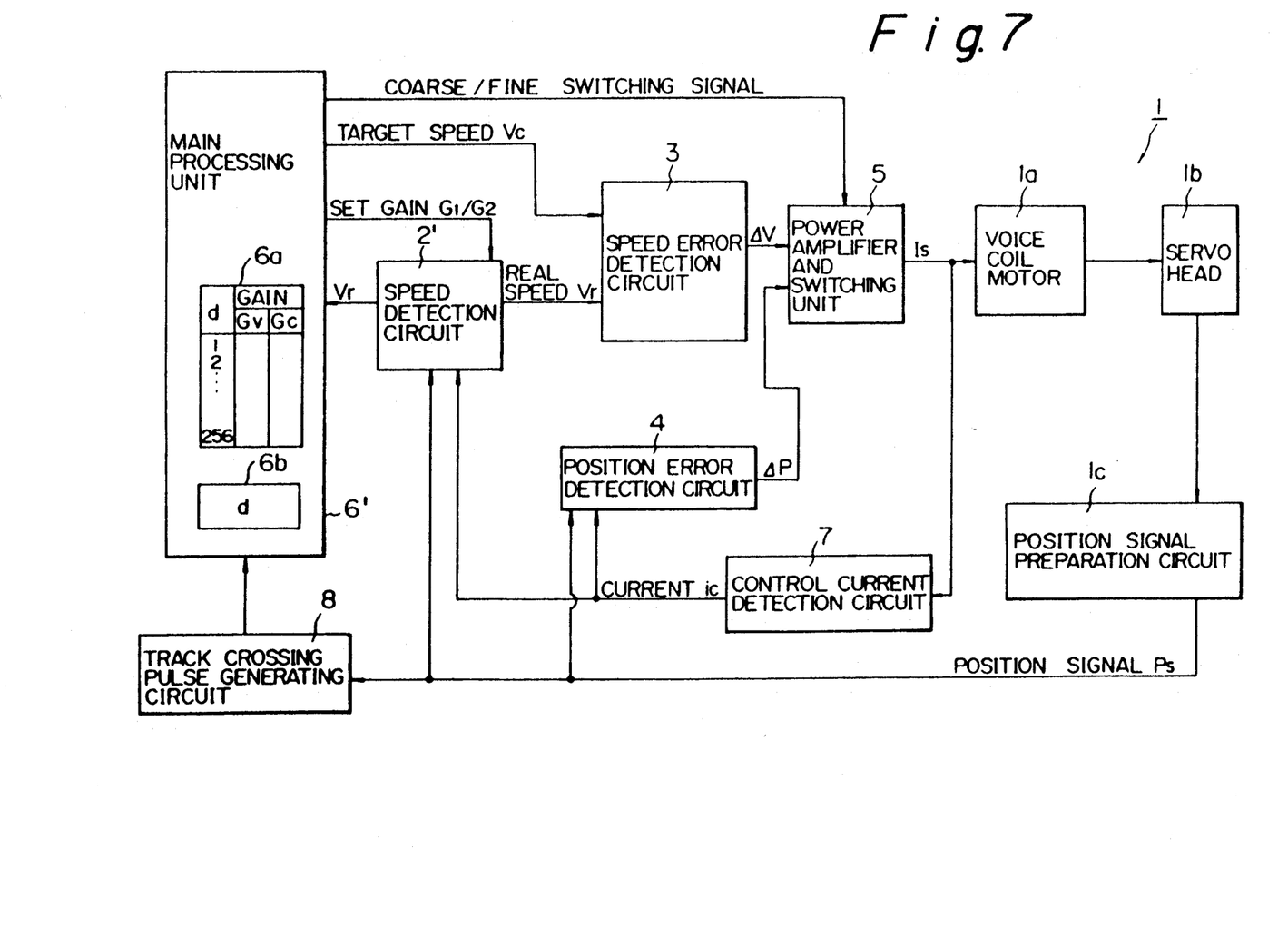
FIG. 7 is a block diagram of an embodiment of the present invention.
Figure 8:
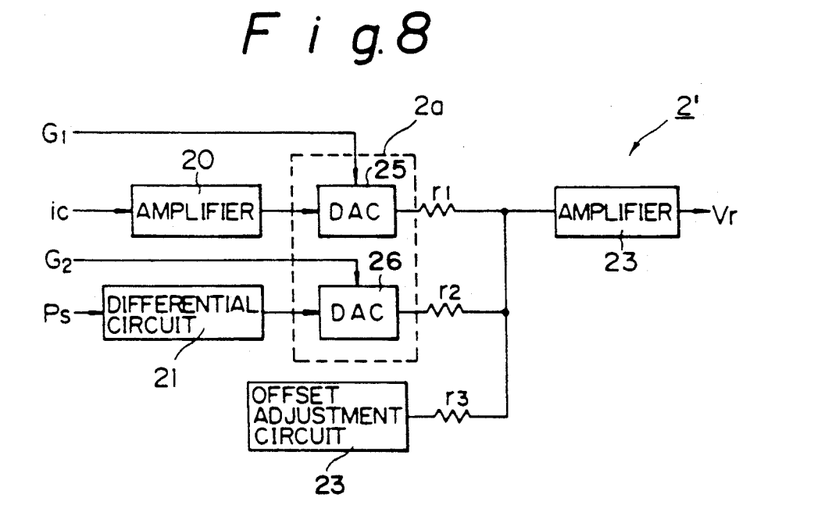
FIG. 8 is a block diagram of a speed detection circuit of the constitution of FIG. 7.
Figure 9A:
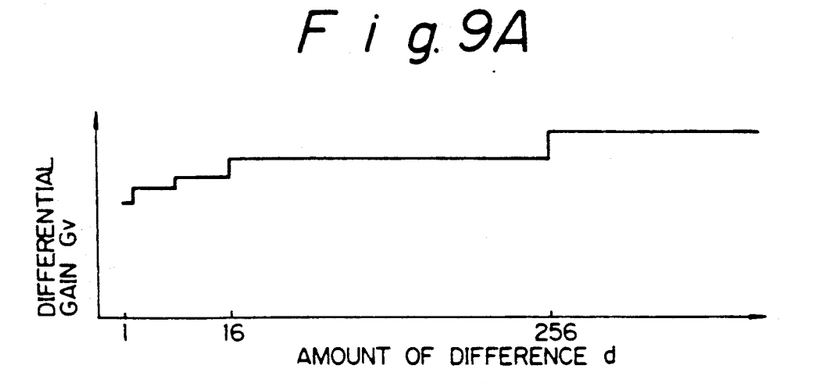
FIGS. 9A and 9B are graphs of a gain table of the constitution of FIG. 7.
Figure 9B:
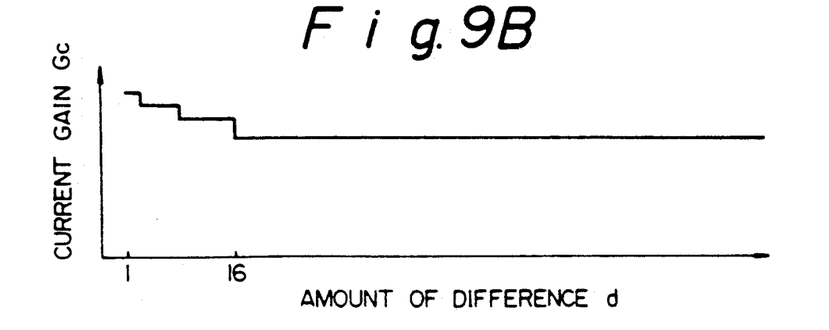

FIG. 7 is a constitutional view of an embodiment of the present invention, FIG. 8 is a constitutional view of a speed detection circuit of the constitution of FIG. 7; and FIGS. 9A and 9B are explanatory views of the gain table of the constitution of FIG. 7.

In the figures, elements the same as those shown in FIG. 1 and FIGS. 6A and 6B are shown by the same symbols.

In FIG. 7, Reference numeral 6a is a gain table, which stores the differential gain Gv and current detection gain Gc according to the amount of difference d. The differential gain Gv becomes smaller the smaller the difference, as shown by FIG. 9A, and becomes constant with d over 256. Further, the current detection gain Gc becomes larger the smaller the difference, as shown by FIG. 9B, and becomes constant with d over 16.

Reference numeral 6b is a difference counter, which is set with a difference value d which is subtracted with each detection of a track crossing pulse, and which shows the remaining difference.

In FIG. 8, reference numerals 25 and 26 are multiplication type digital/analog converters DAC (D/A converters), which multiply a first gain G1 of the main processing unit 6' with the detection current ic from the amplifier 20 and a second gain G2 of the main processing unit 6' with the speed signal of the differential circuit 21 and output the results. DAC's 25 and 26 constitute a speed detection gain adjustment unit 2a. In this case, the detection current ic corresponds to the speed signal.

Figure 10:
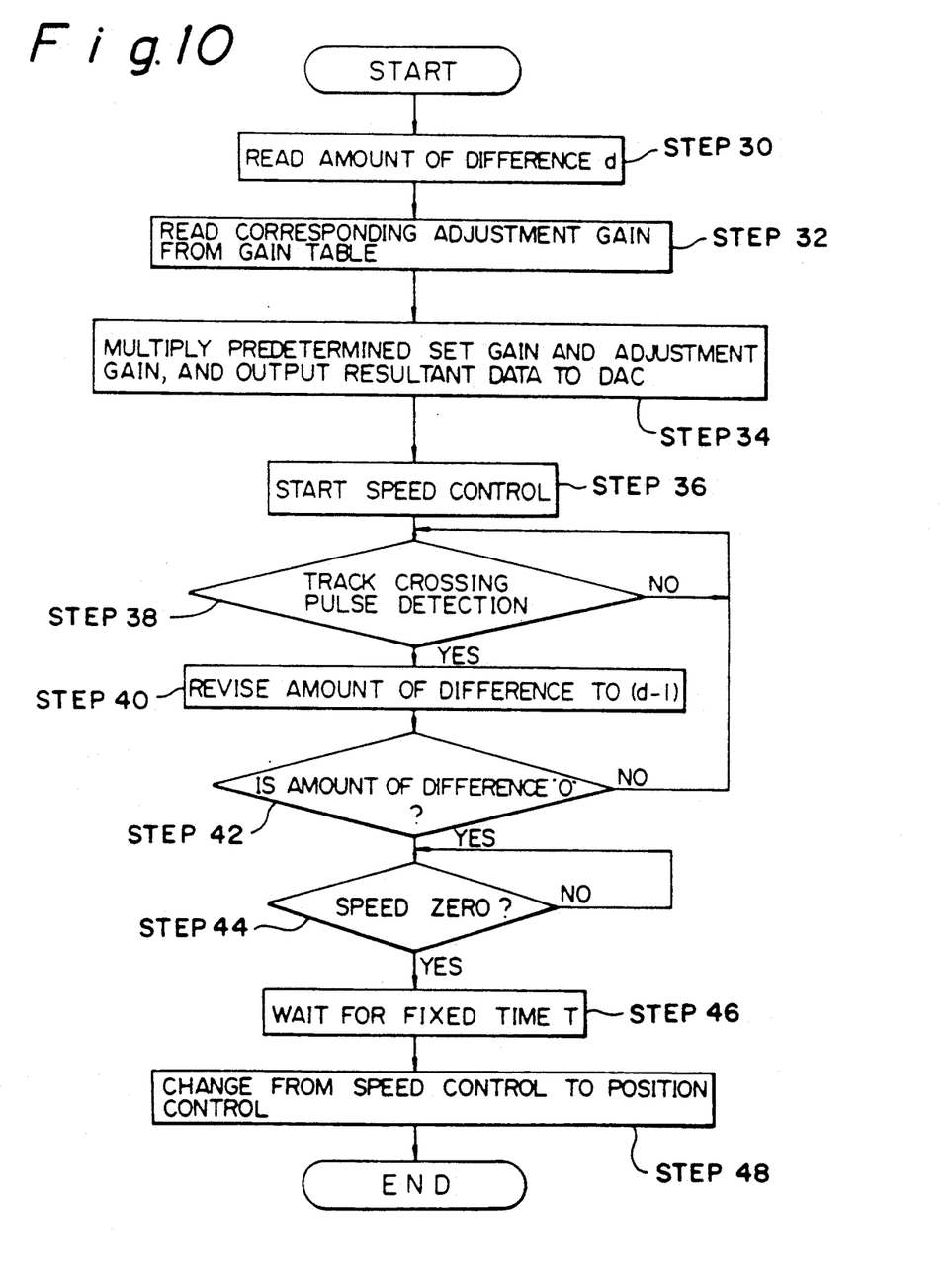
FIG. 10 is a flow chart of the seek processing of an embodiment of the present invention.

FIG. 10 is a flow chart of the seek processing of an embodiment of the present invention. Referring to the figure, the following steps are performed.

The main processing unit (hereinafter referred to as the "MPU") 6' calculates a difference d in accordance with the track position and the current track position specified by an upper unit, and sets it in the difference counter 6b [Step 30].

The MPU 6' refers to the gain table 6a with the difference d and reads the corresponding adjustment gain (differential gain Gv and current detection gain Gc) [Step 32].

Next, the MPU 6' multiplies a predetermined setting gain Gs and the adjustment gains Gv and Gc to obtain a first gain G1 (=Gs×Gc) and second gain G2 (=Gs×Gv) and outputs the same to the D/A converters 24 and 25 of the speed detection circuit 2' [Step 34]. By this, the speed gain of the speed detection circuit 2' is set to a value corresponding to the difference d. Next, the MPU 6' starts the speed control [Step 36]. That is, it generates a target speed curve in accordance with the difference.

At this time, the MPU 6' designates coarse speed control, so the voice coil motor 1a is controlled in speed by the speed error signal ΔV of the speed error detection circuit 3.

Further, in the speed detection circuit 2' the real speed Vr according to the set gain is produced. Therefore, when the difference is small, the generated real speed becomes smaller than the actual real speed.

The MPU 6' detects the track crossing pulses of the track crossing pulse generating circuit 8 and when detecting a track crossing pulse, refreshes the content of the difference counter 6b to (d−1) [Step 38].

Further, the target speed curve is modified in accordance with the content of the difference counter 6b [Step 40].

The MPU 6' then judges if the content of the difference counter 6b is "0", and if not "0", the processing returns to [Step 42].

If the content of the difference counter 6b is "0", the servo object has reached to the vicinity of the target position [Step 42]. The MPU 6' then investigates the real speed Vr of the speed detection circuit 2' and judges if the real speed Vr is near zero of a fixed slice SL [Step 44].

If the real speed Vr is near zero under a fixed slice SL, as shown in FIGS. 5A and 5B, the MPU 6' waits for a certain time T and then switches the coarse/fine [Steps 46, 48] switching signal to fine.

By this, the switching unit 5 switches to the fine position control side, and the voice coil motor 1a is controlled in position by the position error signal ΔP of the position error detection circuit 4.

In this way, the differential gain Gv for the speed detection changes in accordance with the difference, so when the difference is small, the real speed Vr produced is smaller than the actual real speed, and it is possible to make the decelerating real speed curve the same as with a large difference.

Here, the reason why the current detection gain Gc also changes is simply for adjustment purposes. The differential gain Gv mainly acts on the real speed produced.

In the above embodiment, an explanation was made of a magnetic disk apparatus as an example of the servo object, but the invention may be applied to other apparatuses as well.

Further, both the differential gain and the current detection gain were changed, but it is possible to change just the differential gain. Also, the gain based on the difference was obtained by the gain table 6a, but it may also be found by calculation.

Above, an explanation was made of the present invention using embodiments, but the present invention may be modified in many ways within the scope of the gist of the invention. These modifications are not excluded from the present invention.

As explained above, according to the present invention, the speed detection gain changes in accordance with the difference, so the same deceleration speed characteristic can be obtained irregardless of the magnitude of the difference. Even when the difference is small, it is possible to prevent prolongation of the time for movement and positioning. This in particular contributes to higher speeds of positioning. Further, the invention can be realized by changing the speed detection gain, thus the present invention can be easily realized.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to as falling within the scope of the invention.

What is claimed is:

1. A servo positioning apparatus for producing a speed difference signal to control an object having a position, the object including means for producing a position signal corresponding to the position of the object, said apparatus comprising:
servo processing means for receiving the position signal, for outputting a target speed signal and for outputting a speed detection gain based on a movement distance representing the amount of movement required to move the object to a target position;

action means for receiving the speed detection gain and the position signal and for generating a modified real speed signal based on the position signal and the speed detection gain; and speed error detection means for receiving the target speed signal and the modified real speed signal and for outputting the speed difference signal.

2. A servo positioning apparatus as claimed in claim 1, wherein said speed detection means produces a real speed signal and multiplies the real speed signal by the speed detection gain to produce the modified real speed value, and wherein the speed detection gain increases the real speed signal in dependence upon the movement distance.

3. A servo positioning apparatus as claimed in claim 2, wherein the object is positioned to a target track, and wherein the movement distance corresponds to a number of tracks to be moved to position the object to the target track.

4. A servo positioning apparatus as claimed in claim 3, wherein the object has a current position, wherein said apparatus further comprises track cross pulse generating means, operatively connected between the object and said servo processing means, for generating track cross pulses in dependence upon the position signal, wherein said servo processing means includes a difference count means for calculating the movement distance based on the current track and the target track, and wherein said servo processing means decreases the movement difference based on the track cross pulses.

5. A servo positioning apparatus as claimed in claim 1, wherein said apparatus further comprises:

position error detection means for receiving the position signal and for generating a position error signal used for position control of the object; and selection means for selecting one of the modified real speed signal for speed control of the object and the position error signal for position control of the object.

6. A servo positioning apparatus as claimed in claim 5, wherein said selection means outputs a control current to the object in dependence upon the selection of one of the modified real speed signal and the position error signal, wherein said apparatus further comprises current control detection means for detecting the control current and for generating a detected current signal in dependence upon the control current, wherein the speed detection gain includes a current detection gain and a differential gain, and wherein said speed detection means comprises:

first multiplying means for multiplying the detected current signal by the current detection gain;

differential means for producing a speed signal from the position signal; and second multiplying means for multiplying the speed signal by the differential gain.

7. A servo positioning apparatus as claimed in claim 5, wherein said selection means outputs a control current to the object in dependence upon the selection of one of the modified real speed signal and the position error signal, wherein said apparatus further comprises current control detection means for detecting the control current and for generating a detected current signal in dependence upon the control current, and wherein said speed detection means receives the detected current signal, produces a real speed signal based on the position signal and the detection current signal, and multiplies the real speed signal by the speed detection gain to produce the modified real speed value.

8. A servo positioning apparatus as claimed in claim 7, wherein the speed detection gain increases the real speed signal in dependence upon the movement distance.

9. A servo positioning apparatus as claimed in claim 8, wherein the object is positioned to a target track, and wherein the movement distance corresponds to a number of tracks to be moved to position the object to the target track.

10. A servo positioning apparatus as claimed in claim 9, wherein the object has a current position, wherein said apparatus further comprises track cross pulse generating means, operatively connected between the object and said servo processing means, for generating track cross pulses in dependence upon the position signal, wherein said servo processing means includes a difference count means for calculating the movement distance based on the current track and the target track, and wherein said servo processing means decreases the movement difference based on the track cross pulses.

11. A servo positioning circuit for controlling the positioning of an object under servo control to a target position by switching from speed control to position control in the vicinity of the target position, said servo positioning circuit comprising:

position signal generation means for generating a position signal indicative of a position of the object under servo control;

speed detection means for detecting a real speed based on the position signal, said speed detection means includes speed detection gain adjustment means for receiving a speed detection gain and for adjusting the real speed based on the speed detection gain;

speed error detection means for generating a speed difference error signal based on a target speed and the real speed;

position error detection means for generating a position error signal based on the position signal;

switching means for switching connection of the object to one of said speed error detection means and said position error detection means; and main processing means for generating the target speed in accordance with the position signal and for controlling the switching by said switching means, said main processing means changes the speed detection gain of said speed detection gain adjustment means in accordance with an amount of movement to position the object to the target position.

12. A servo positioning circuit as claimed in claim 11, wherein said main processing means comprises a gain table storing a differential gain and a current detection gain in accordance with a difference value corresponding to the amount of movement to position the object to the target position, the differential gain being set to a smaller value the smaller the difference value, and the current detection gain being set to a larger value the smaller the difference value.

13. A servo positioning circuit as claimed in claim 12, wherein said main processing means further comprising a difference counter storing the difference value.

14. A servo positioning circuit as claimed in claim 11, wherein the speed detection gain causes a small difference real speed curve to closely approximate a large difference real speed curve.

15. A servo positioning circuit as claimed in claim 11, wherein said speed detection means further comprises an amplifier for amplifying a detection current, and a differential circuit for differentiating the position signal to obtain a speed signal.

16. A servo positioning circuit as claimed in claim 15, wherein said speed detection gain adjustment unit comprises first and second multiplication type digital-/analog converters, said first multiplication type digital-/analog converter receives a first gain from said main processing means and the detection current from said amplifier, and said second multiplication type digital-/analog converter receives a second gain from said main processing means and the speed signal of the differential circuit.

17. A servo positioning circuit as claimed in claim 16, wherein said processing means comprises a gain table storing a differential gain and a current detection gain based on the amount of movement, and wherein the first gain is obtained by multiplying a predetermined gain by the current detection gain, and the second gain is obtained by multiplying the predetermined gain with the differential gain.

18. A method for producing a speed difference signal to control an object having a position, the object including means for producing a position signal corresponding to the position of the object, said method comprising the steps of:
(a) determining a movement distance representing the amount of movement required to move the object to a target position;
(b) producing a speed detection gain based on the movement distance;
(c) generating a modified real speed signal based on the position signal and the speed detection gain; and
(d) producing the speed difference signal based on a difference between a target speed signal and the modified real speed signal.

19. A method as claimed in claim 18, wherein said producing in step (b) includes the substeps of:
(i) producing a real speed signal; and
(ii) multiplying the real speed signal by the speed detection gain to produce the modified real speed value.

20. A method as claimed in claim 19, wherein the speed detection gain increases the real speed signal in dependence upon the movement distance, the speed detection gain increases as the movement distance increases.

* * * * *